United States Patent

[11] 3,572,905

| [72] | Inventor | Werner Schlapp<br>Asslar Kreis Wetzlar, Germany |
| --- | --- | --- |
| [21] | Appl. No. | 813,509 |
| [22] | Filed | Apr. 4, 1969 |
| [45] | Patented | Mar. 30, 1971 |
| [73] | Assignee | Ernst Leitz GmbH<br>Wetzlar, Germany |
| [32] | Priority | Apr. 10, 1968, Jan. 7, 1968 |
| [33] | | Germany |
| [31] | | L47,154 and P 19 00 547.1 |

[54] LENS HOOD
8 Claims, 4 Drawing Figs.

[52] U.S. Cl. ................................................. 350/257
[51] Int. Cl. ....................................................... G02b 7/02
[50] Field of Search.......................................... 350/245,
252, 255, 257, 58—60, 315, 318

[56] References Cited
UNITED STATES PATENTS
2,260,991  10/1941  Gorey........................... 350/257
2,496,928  2/1950  Bing et al....................... 350/252
2,937,563  5/1960  Ranft et al..................... 350/159

FOREIGN PATENTS
19,842  1891  Great Britain................. 350/257

*Primary Examiner*—David Schonberg
*Assistant Examiner*—Michael J. Tokar
*Attorney*—Krafft and Wells ABSTRACT: In the tubular rear member of a lens hood is provided at least one slot extending in axial and in circumferential direction. The slot is adapted to receive a pin stationarily secured on the front portion of the objective mount, and spring means are arranged near the slot for resiliently locking the pin in the slot when the hood is mounted on the lens.

The inner diameter of the tubular member corresponds to the standardized diameter of a filter series so that different filters can be inserted into the hood prior to mounting. The inner surface of the tubular member is provided with a shoulder against which the filters abut, and in one particular embodiment of the invention means for rotating the filter are incorporated.

INVENTOR
Werner Schlapp
BY Krafft & Wells
ATTORNEYS

LENS HOOD

CROSS-REFERENCE TO RELATED APPLICATIONS

Applicant claims priority under 35 USC 119 for applications L 47 154/57a Gbm filed Apr. 10, 1968, and P 19 00 547.1 filed Jan. 7, 1969, in the Patent Office of the Federal Republic of Germany.

BACKGROUND OF THE INVENTION

The present invention relates to lens hoods for photographic objectives.

Various types and designs of lens hoods are already known and available on the market. Object of the present invention is to provide a lens hood which can also be used as a mounting for filters, more particularly, as a mounting for filters out of a series having a common standardized diameter.

Another object of the invention is to provide a lens hood which can optionally be used with a filter or without. Another object of the invention is to provide a lens hood which resiliently locks on the lens mount thereby eliminating the danger of the camera dropping off when the apparatus is seized by the lens hood.

Another object of the invention is to provide at lens hood means for rotating the inserted filter, particularly a polarizing filter.

SUMMARY OF THE INVENTION

The above-stated objects are attained by providing in the tubular rear member of the lens hood at least one slot extending in axial and circumferential direction for the reception of a pin protruding radially from the front portion of the lens mount. A spring means is disposed near the slot which spring retains the pin resiliently when the hood is mounted on the lens.

The inner diameter of the tubular member is made to match the standardized diameter of a filter series so that various filters can be chosen for insertion into the hood where they abut against a shoulder on the inner cylinder surface.

At one side of the tubular member is provided another slot in the cylinder wall through which extends a pinion having a shaft in parallel to the optical axis. At the lens hood the pinion is supported by a spring means so as to be slightly displaceable in the direction of the objective axis when pressure is exerted on its outer circumference. Upon displacement the circumference of the pinion will contact the cylindric surface of the filter and rotation of the pinion, for example by a finger, will result in a corresponding rotation of the filter.

DESCRIPTION OF THE DRAWINGS

The invention will be more readily comprehended from the following description when taken in conjunction with the appending drawings, wherein two embodiments of the invention are illustrated by way of example, and wherein.

DESCRIPTION OF THE PREFERRED EMBODIMENTS

Figure 1:
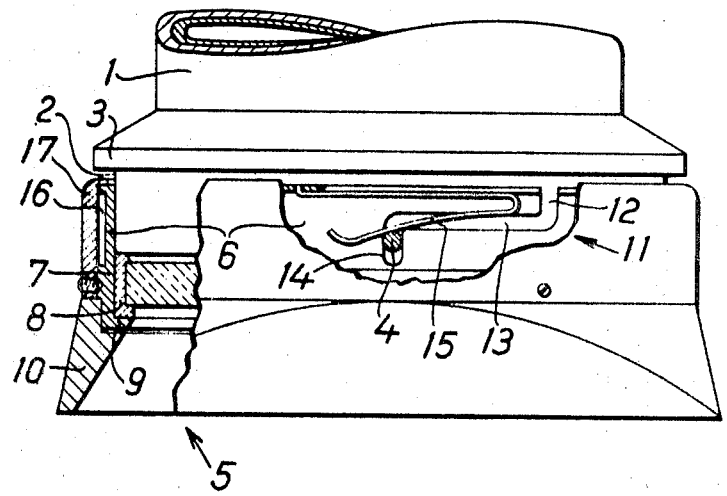
FIG. 1 is a partially cut away view of a first embodiment of the invention.

Referring now to the drawings the objective 1 is at its front end provided with a cylindrical portion 2 which has a shoulder 3. From the cylindrical surface project two pins 4 on opposite sides, i.e. displaced by 180° relative to one another.

A lens hood 5 has a tubular member 6 with a cylindrical hole 7. The diameter of hole 7 corresponds both to the diameter of portion 2 and to the standardized diameter of a filter 8 selected from a whole series of filters. The inner surface of tubular member 6 has at its front end a shoulder 9 which limits hole 7 in this direction and from whereon the conical portion 10 of the lens hood extends in the direction of the object to be photographed.

The tubular member 6 is on opposite sides provided with a slot 11 having an axially extending branch 12, a circumferentially extending branch 13, and a further axially extending branch 14. Thus, the slot 12 is actually Z shaped. Across branch 13 is placed wire spring 15 of which one end is secured end is secured to the the tubular member 6 while the other end is left free under cover of a ring 17 placed over member 6 and defining a space 16 between member 6 and cover ring 17. When the pin 4 moves in slot 11 from branch 12 through branch 13 to branch 14 spring 15 will be tensioned. More particular, spring 15 will be supported by pin 4 and will tend to displace member 6 in the direction of shoulder 3.

If a filter is placed in the tubular member 6 the mount of this filter will abut against shoulder 9, and it is of no significance whether the filter (or its mount) is of great or little width, or whether no filter at all is placed in member 6. The lines hood 5 will in any case be resiliently locked on the objective with the member 6 abutting against shoulder 3 if no filter is inserted.

Figure 2:
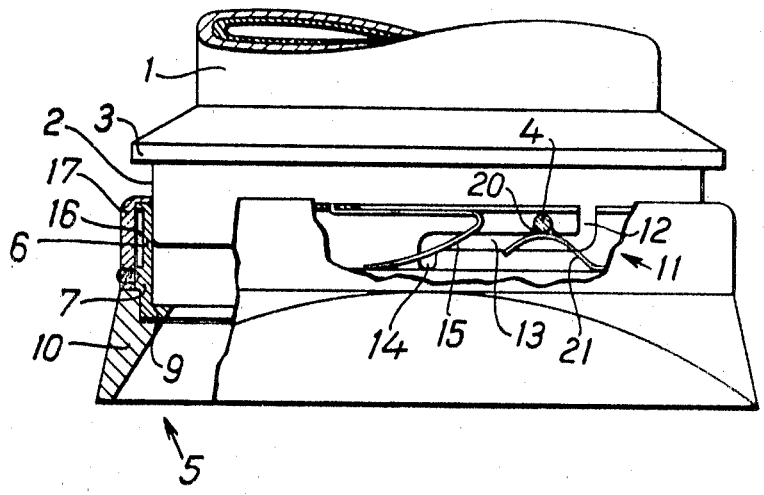
FIG. 2 is a partially cut away view of a second embodiment of the invention.

In the embodiment illustrated in FIG. 2 the slot 11 has additionally a recess 20 which extends from branch 13 to the rear of the lens hood. With recess 20 is associated a further spring means 21 which is tensioned when pin 4 moves out of recess 20 and which is bent in such a way that it guides pin 4 to recess 20 whenever pin 4 is displaced in branch 13 in either direction. In the event of the camera, complete with objective and lens hood, being seized by that lens hood, recess 20 serves as an additional safety device against the camera dropping off the lens hood, since pin 4 is caught in recess 20.

Figure 3:
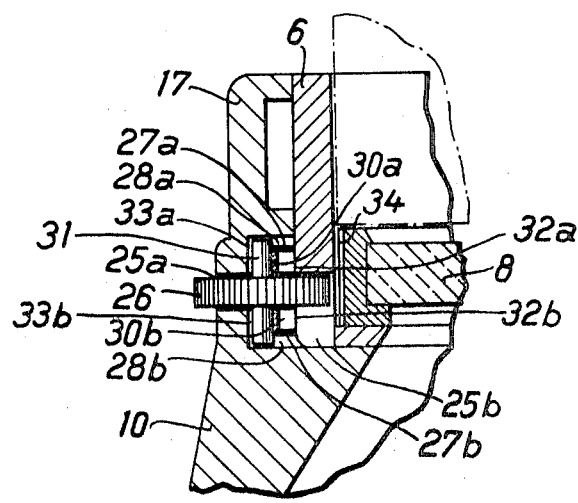
FIG. 3 is a sectional view of the filter rotating means which can be incorporated into both the embodiments illustrated in FIG. 1 and FIG. 2.
Figure 4:
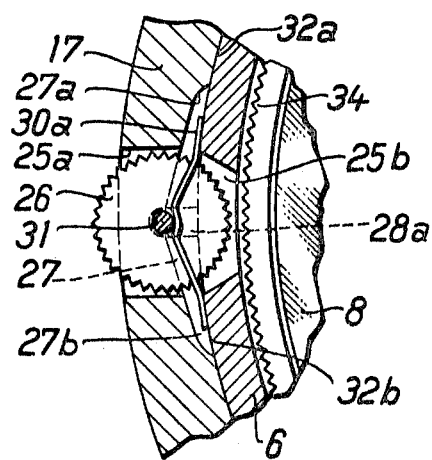
FIG. 4 is a sectional plan view of the filter rotating means according to FIG. 3.

The filter rotating means illustrated in FIGS. 3 and 4 can be incorporated into an embodiment of the invention as shown in FIG. 1 and also in an embodiment according to Fig. 2. For this reason like elements are denoted by like reference numbers, with the conical portion 10 and cover ring 17 being referred to as the "outer members."

Rotating of the filter relative to the objective becomes significant when filter 8 is a polarizing filter. Such filter can be inserted into tubular member 6 like any other filter from a series having a common diameter without requiring special fixing or mounting means. If the camera used is an SLR-camera the correct angular position of the filter can be determined from looking through the view finder.

In the tubular member 6 and the cover ring 17 is provided a further slot 25a, 25b which houses a knurled pinion 26. An arcuate groove comprising two branches 27a, 27b is cut into the inner surface of the cover ring 17 and another groove 28a, 28b extends perpendicularly thereto. In the branches 27a, 27b of the first-mentioned groove is disposed a spring which comprises the ends 30a, 30b while in the groove 28a, 28b the shaft 31 of pinion 26 is journaled. The spring ends 30a, 30b are being supported by the surfaces 32a, 32b of member 6 and exert a force in radial direction on shaft 31 which causes the latter to abut against surfaces 33a, 33b of the cover ring 17. The diameter of pinion 26 is so designated as not to project from the inner surface of tubular member 6 into the region of filter 8. The filters can thus be inserted into the lens hood without obstruction.

Pinion 26 can, for example by finger pressure on the pinion portion which projects outwardly from the cover ring 17, be displaced in radial direction towards the optical axis, against the forces exerted by the spring ends 30a, 30b with shaft 31 sliding in the grooves 28a, 28b. The inner portion of pinion 26 comes thus into mesh with the knurled cylinder surface 34 of the polarization filter 8, as a consequence whereof filter 8 can be adjusted by rotating pinion 26.

The component parts of the lens hood are preferably assembled by means of bolts and/or adhesives. They can be solid parts or can themselves be assembled from smaller parts. With regard to the embodiment illustrated in FIGS. 3 and 4 it will be expedient if the outer members 10/17 are assembled from at least two component parts, one of which is provided with slot 25a and is made of strong plastic material or metal, while the conical part is made from elastic plastic material or rubber. However, in the embodiments shown in FIGS. 1 and 2 it is also advisable to make the conical portion 10 of rubber so that it can readily be turned backwards.

The mounts of series filters come in two different thicknesses. The resilient action of spring 15 compensates for the difference in thickness without affecting the angular position of the lens hood as would be the case with a bayonet coupling. Further, measurements have proven that the invented manner of mounting the lens hood on the objective does not cause an internal stress in the filter as is sometimes caused by screwed connections.

I claim:

1. A lens hood mounted on the cylindrical front portion (2) of an objective (1) to support a filter in front of said objective, said lens hood comprising in combination: a tubular rear member (6) having an inner diameter corresponding both to the diameter of the cylindrical front portion (2) of said objective and to the standardized diameter of a series of filters (8), and said tubular rear member being provided with a Z-shaped slot formed in the tubular wall area (12,13,14) extending in axial and in circumferential direction along said wall, said slot receiving a pin (4) positively secured to and radially projecting from said cylindrical front portion (2) of said objective (1), a first spring means (15) fixed to said tubular rear member (6) so as to extend with its resilient end across said slot (12,13,14) said first spring means engaged by said pin when said lens hood is mounted on said objective, and an abutment (9) provided at the front portion inside said tubular member, said abutment defining a cylindrical space within a filter (8) can be inserted from the rear prior to mounting said lens hood on said objective.

2. A lens hood as claimed in claim 1, and further comprising a recess (20) in said branch (13) extending in the direction of the circumference, said recess extending to the rear end of the lens hood, and second spring means (21) secured to said tubular member, the resilient end of which is arranged to guide said pin (4) into said recess (20) upon movement of said pin in said circumferentially extending branch (13) in either direction.

3. A lens hood as claimed in claim 1, and further comprising a cover ring (17) to cover said tubular member on the outside and defining between said member (6) and the inner surface of said ring (17) a ring-shaped space wherein said spring means (15) and said second spring means (21) are disposed.

4. A lens hood as claimed in claim 3, wherein the conical part (10) of the lens hood is a solid portion of said cover ring (17).

5. A lens hood as claimed in claim 3, and further comprising means to rotate said filter inside said lens hood when said lens hood when said lens hood is mounted on said objective.

6. A lens hood as claimed in claim 5, wherein said means comprises a rotatable pinion (26) displaceable in a radial slot (25a, 26b) in said tubular member (6) and said cover ring (17), and spring means (30a, 30b) to keep said pinion resiliently out of mesh with the circumference of said filter.

7. A lens hood as claimed in claim 6, wherein said pinion (26) has a shaft (31) which is journaled in a groove (28a, 28b) on the inside of said cover ring which groove extends at right angle to said radial slot (25a, 25b).

8. A lens hood as claimed in claim 6, wherein said spring means (30a, 30b) is housed in a groove (27a, 27b) extending in circumferential direction on the inner side of said cover ring and is supported on the outside of said tubular member.